United States Patent [19]
Silverberg et al.

[11] Patent Number: 5,406,622
[45] Date of Patent: Apr. 11, 1995

[54] OUTBOUND NOISE CANCELLATION FOR TELEPHONIC HANDSET

[75] Inventors: Michael H. Silverberg, Livingston; Roger D. Benning, Long Valley; Norman B. Thompson, Rockaway, all of N.J.

[73] Assignee: AT&T Corp., Murray Hill, N.J.

[21] Appl. No.: 114,851

[22] Filed: Sep. 2, 1993

[51] Int. Cl.⁶ .................. H04B 15/00; H04M 1/00
[52] U.S. Cl. .................. 379/387; 379/416; 379/392; 379/411; 381/71; 381/94; 381/47
[58] Field of Search .......... 379/387, 411, 416, 388, 379/389, 392, 417, 411; 381/71, 94, 92, 46, 47

[56] References Cited

U.S. PATENT DOCUMENTS 5,033,082  7/1991  Eriksson et al. ............... 379/388 X
5,131,047  7/1992  Hashimoto et al. ............. 381/94 X
5,251,263  10/1993  Andrea et al. ................ 381/94 X

*Primary Examiner*—James L. Dwyer
*Assistant Examiner*—Paul A. Fournier
*Attorney, Agent, or Firm*—Martin I. Finston

[57] ABSTRACT

A telephone handset outbound noise canceller uses an omnidirectional reference microphone placed near the transmitter grille. Two adaptive filters are employed, one driven by the handset transmitter to subtract speech from a reference value to produce an enhanced reference signal; and a second adaptive filter driven by the enhanced reference signal to subtract noise from the transmitter. The weights of the two adaptive filters are allowed to adapt or are frozen according to criteria set as a result of transmitter power measurements which determine whether speech is likely to be present or not.

5 Claims, 1 Drawing Sheet

OUTBOUND NOISE CANCELLATION FOR TELEPHONIC HANDSET

FIELD OF THE INVENTION

This invention relates to reducing the entry of acoustic energy into a telephone network, particularly locally generated acoustic noise occurring in the vicinity of a telephone handset in the course of a call.

BACKGROUND OF THE INVENTION

Most acoustic background noise at or near the location of a telephone is to some extent introduced into the network along with the desired transmitted speech. Frequently, the noise affects speech intelligibility, or is at least distracting to the distant party. In addition, digital coding of the speech content of a signal that contains substantial incoming noise is prone to data errors because of the noise content.

Previous approaches to reducing outbound acoustic noise cancellation have included passive expander circuits such are used in the electret-type telephonic microphone. These, however, suppress only low level noise occurring during periods when speech is not present. Further, expander circuits suppress no noise whatever during speech. Passive noise-cancelling microphones are also used to reduce outbound noise. These have a tendency to attenuate and distort the speech signal when the microphone is not in close proximity to the user's mouth; and further are typically effective only in a frequency range up to about 1 KHz.

Active noise-cancellation circuitry to reduce outbound noise has been suggested which employs a noise-detecting reference microphone and adaptive cancellation circuitry to generate a continuous replica of the outbound noise signal that then is subtracted from the total outbound signal before it enters the network. Most such arrangements still are not sufficiently effective, however. They are susceptible to cancellation degradation because of a lack of coherence between the noise signal received by the reference microphone and the noise signal impinging on the transmit microphone. Their performance also varies depending on the directionality of the noise; and they also tend to attenuate or distort the speech.

SUMMARY OF THE INVENTION

Substantially improved all-direction cancellation is achieved using a 2-filter adaptive noise cancellation circuit. The first filter operates on speech signal and the second filter operates on noise signal. The respective filter weights are updated only at certain specific times, depending on whether speech is or is not present, rather than being updated continuously. The 2-filter arrangement also allows the reference microphone to be tolerant of higher levels of speech energy. The reference microphone therefore can be mounted substantially closer to the transmit microphone. As a result, a substantially improved coherence between the noise signals received by the reference microphone and the transmit microphone is achieved. Improved coherence in turn permits improved all-direction cancellation.

The determination whether outbound speech is present or absent at the handset transmitter, is made by sampling the transmitter power level and detecting power above or below certain threshold values. The thresholds can be varied to optimize the determination. When speech is determined to be present, the weights of the speech adaptive filter are allowed to update. When speech is not present, the weights of the noise adaptive filter are allowed to update. Otherwise all weights are frozen.

IN THE DRAWING

FIG. 1 is a high-level schematic block diagram of circuit functions of the present invention; and FIG. 2 is high-level schematic block diagram of a control mechanism for the weight updating of the adaptive filters in FIG. 1.

DETAILED DESCRIPTION OF AN ILLUSTRATIVE EMBODIMENT

Figure 1:
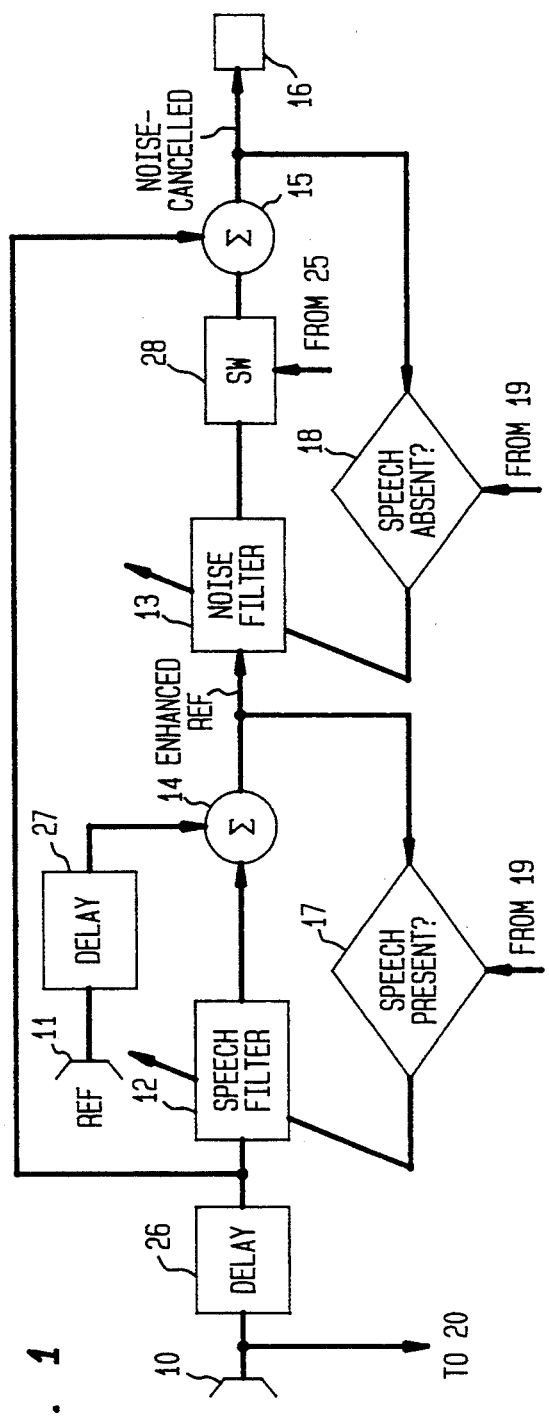

In FIG. 1, an outbound noise cancellation circuit embodying the invention consists of a transmit microphone 10 and one or more noise-collecting reference microphones such as microphone 11. Speech as well as acoustic noise impinges on each of the microphones 10, 11. Unprocessed output of microphone 10 is connected to a summer 15, where it is combined with a uniquely developed noise-cancellation signal to remove outbound noise before it reaches telecommunications network 16.

A first adaptive filter 12 receives the output of microphone 10. The speech and acoustic noise output of reference microphone 11 and the output of filter 12 are connected to summer 14 where the speech signal from filter 12 is subtractively combined with the output of reference microphone 11 to provide at the summer output an enhanced reference signal which has little or no speech signal content.

The enhanced reference signal output of summer 14 is connected to a second adaptive filter 13. Filter 13 produces an output which consists substantially of noise energy only. The output of filter 13 is a unique noise-cancellation signal. The structure and function of adaptive filters 12, 13 will now be further explained.

The adaptive filters 12, 13 may be constructed in accordance with the examples provided in Chapter 6 of the textbook "Adaptive Signal Processing" by B. Widrow and S. D. Stearns, Prentice-Hall, 1986. This text to the extent relevant is incorporated by reference. The filters there described basically are transversal filters with serial delay lines and taps following each delay. The filter 12 when so constructed creates a reference signal than accounts for the difference in frequency response between the transmit microphone 10 and reference microphone 11. The length of the filter, i.e., the number of delays and taps, is determined by the frequency resolution needed. In this case, filter 12 samples the input from transmit microphone 10 at a rate of about 8 KHz., in order to process frequencies of up to about 4 KHz. The samples are conventionally stepped into the elements of filter 12 and collectively shifted over one tap at each sample time. Following each shifting, the data value at each tap, which represents successive input signal amplitudes, is multiplied by the weighting factor associated with each respective tap. Then, all of the products are summed to produce a filter output.

The weighting factors may be adjusted, for example, by using the well-known Least Mean Squares ("LMS") algorithm as described in the cited textbook by Widrow et. al. to increment each tap weight with the product of: the tap signal; an error measurement which in the case of filter 12 is the enhanced reference signal; and a constant μ which takes into account stability and noise considerations.

Filter 13 operates in an exactly analogous manner. Other forms of adaptive update algorithms may be used instead of the LMS, and might provide faster convergences under certain noise conditions. Also, any of a number of commercially available digital signal processors mounted on integrated circuit chips may be used to provide the processing described.

In accordance with one aspect of the invention, each of the filters 12, 13 is active or not depending on the presence or absence of speech energy. If speech energy is present, the weights of speech adaptive filter 12 are allowed to update; but if speech is absent, the weights of speech adaptive filter 12 are frozen at their last setting as of when speech energy disappeared. Further, if speech is NOT present, the weights of noise adaptive filter 13 are allowed to update; and otherwise the weights of noise adaptive filter 13 are frozen at their last setting as of when speech energy disappeared. In FIG. 1, filter weight controllers 17, 18, triggered in accordance with outputs from the FIG. 2 circuit, either enable or freeze the weight update activity.

Advantageously, a low-level noise unit 25 may be provided to activate switch 28, which switches off the noise cancellation altogether when the sensed noise energy falls below a certain "floor" or low level threshold value.

Figure 2:
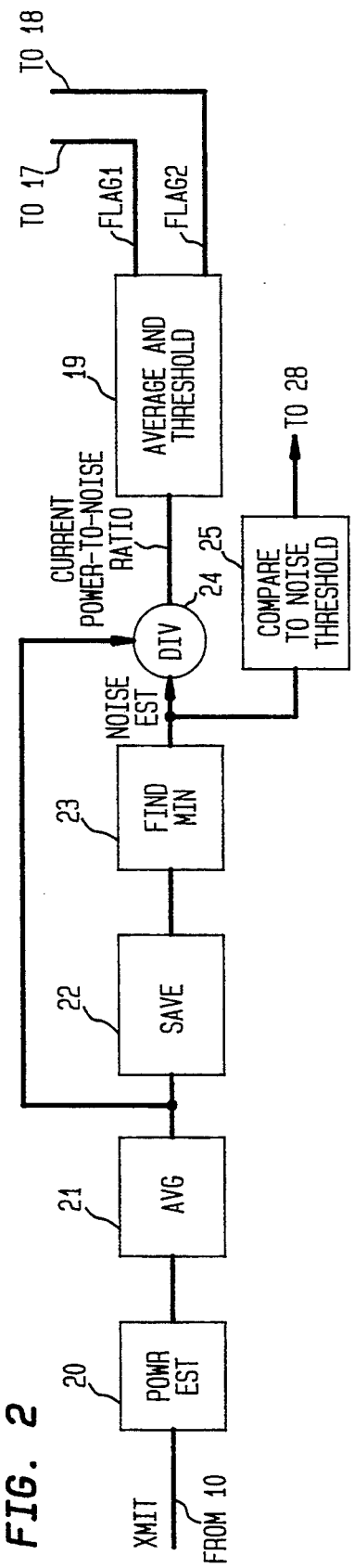

Referring now to FIG. 2, one method for generating filter weight enable/freeze control signals is to continuously monitor the output from transmit microphone 10, and from these measurements produce a current power estimate and a current noise power estimate.

The power output of microphone 10 typically reflects either both speech and noise input or noise-only input. The output of microphone 10 is sampled by estimator 20. An average of the most recent samples taken by estimator 20, reflecting a period of about 30 msec., is continually made by averaging circuit 21. A time of 30 msec. is advantageous because it is of lesser duration than the typical silent time interval which occurs between speech syllables. This average is taken to be the current power. The 30 msec. averaging parameter and other parameters of the instant process may be varied.

To calculate the noise power, a substantial number of the calculated power output averages generated by circuit 21 are saved in store 22. The number saved may typically be 1024, which represents about 3 seconds. The number should be sufficiently high to include a number of averages derived purely from an underlying stable level of noise energy. The current noise estimate is taken as the minimum reading among the total readings stored in store 22; this minimum is calculated in unit 23.

Now, in accordance with the invention, the current power estimate is divided by the current noise power estimate in arithmetic unit 24, to yield an output which reflects the current overall power-to-noise power ratio. This ratio number is forwarded to threshold and averaging unit 19.

In unit 19, the average of the last six such ratios is calculated. The delay units 26 and 27 seen in FIG. 1 are included so that the last three of these ratios correspond to samples not yet processed by filters 12, 13, thus providing a capability that in effect anticipates the onset of speech, in order to achieve rapid control of the weight update activity. Also, the choice of using the most recent six ratios provides some smoothing while still responding rapidly to the onset of speech.

The outputs of unit 19 are on-off signals or "flags", obtained by comparing smoothed ratio readings with threshold settings. A first threshold setting is, for example, a value of "10" for triggering the flag to controller 18. A second threshold setting is, for example, a value of "60" for triggering the flag to controller 17.

If the ratio calculated is 10 or less, it is assumed that no speech is present; and, therefore, noise filter 13 is enabled to do weight updating while the speech filter 12 weights are frozen. If the ratio calculated is 60 or more, it is assumed that speech is present; and speech filter 12 is enabled to do weight updatings while the noise filter 13 weights are frozen.

When the smoothed ratio value in unit 19 is greater than 10 but less than 60, both weight updates simply remain frozen until the calculated ratio value goes below 10 or above 60.

Although only one reference microphone has been described, more than one may be integrated into the handset design.

We claim:

1. In a telephone instrument comprising a transmit microphone and means connecting said instrument to a telephone network, apparatus for reducing entry into said network of acoustic background noise comprising:

a reference microphone for picking up noise signals;

a noise-cancellation circuit comprising a first adaptive filter connected to said transmit microphone for conditioning speech signals and a second adaptive filter for receiving a signal consisting substantially of noise only, for conditioning said noise signals;

each said filter comprising:

plural transversal elements arrayed as serial delay lines each having an output tap following each said element, and each said filter further comprising weighting means for modifying the outputs of its respective taps;

said first adaptive filter comprising means for periodically sampling the output of said transmit microphone and said second adaptive filter comprising means for periodically sampling said noise-only signal;

said first adaptive filter weighting means being adapted for modifying the outputs of the corresponding output taps in accordance with the most recent transmit microphone samples;

means for additively combining the outputs of said respective first adaptive filter taps and second adaptive filter taps to produce a respective output for each said filter;

first summing means for summing the outputs of said reference microphone and said first filter;

means for connecting the output of said first summing means to the input of said second filter;

second summing means for summing the outputs of said second filter and of said transmit microphone and for feeding the result to a network;

first settable threshold means defining the presence of speech and second settable threshold means defining the absence of speech;

means including said first and said second settable threshold means for generating, when a measure of speech power exceeds said first threshold means, a first signal indicative of the presence of speech at said transmit microphone and for generating, when said measure of speech power falls below said second threshold means, a second signal indicative of the absence of speech at said transmit microphone;

means, responsive to said first signal, for updating said weighting means of said first adaptive filter while holding said weighting means of said second adaptive filter frozen; and means, responsive to said second signal, for updating said weighting means of said second adaptive filter while holding said weighting means of said first adaptive filter frozen.

2. Apparatus in accordance with claim 1, further comprising means for holding said weighting means of both said first and second adaptive filters frozen when said measure of speech power falls between the current settings of said first and second threshold means.

3. Apparatus in accordance with claim 2, further comprising means for sensing when noise energy falls below a predetermined level; and means responding to said sensing means for switching off said noise-cancellation circuit.

4. Apparatus in accordance with claim 3, wherein said means for generating a signal indicative of the presence or the absence of speech comprises:

means for taking samples of the output of said transmit microphone;

means for averaging a plurality of the most recent said samples to produce an indicia of total current power output;

means for calculating an estimate of noise power;

means for dividing the value of said current power output by the current noise power estimate to form a current overall power-to-noise power ratio;

means for averaging a plurality of the most recently-developed said ratios; and means for deriving from said average an indicia of the onset of speech.

5. Apparatus for reducing the introduction of outbound noise into a communications network from a telecommunications device, said apparatus comprising:

a transmit microphone and a reference microphone closely disposed to said transmit microphone, both microphones being mounted in said device;

a speech adaptive filter comprising means for periodically sampling an output of said transmit microphone and generating an output signal replicating the total outbound signal into said network;

a noise adaptive filter comprising means for periodically sampling the sum of the output of said reference microphone and said output signal of said speech adaptive filter, and for generating from said sampling an output signal replicating said outbound noise;

said speech adaptive filter and said noise adaptive filter each comprising an updatable weighting means for modifying said respective output signals of said filters;

first settable threshold means for producing a first indication defining the presence of speech at said transmit microphone;

second settable threshold means for producing a second indication defining the absence of speech at said transmit microphone;

means responsive to said first indication for updating said weighting means of said speech adaptive filter while holding said weighting means of said noise adaptive filter frozen; and means responsive to said second indication for updating said weighting means of said noise adaptive filter while holding said weighting means of said speech adaptive filter frozen;

whereby said respective filters are active or not depending on the presence or absence of speech energy at said transmit microphone.

* * * * *